United States Patent
Rao et al.

(10) Patent No.: US 7,720,890 B2
(45) Date of Patent: May 18, 2010

(54) GHOSTED SYNCHRONIZATION

(75) Inventors: Rajesh M. Rao, Sammamish, WA (US);
Okechukwu C. Echeruo, Kent, WA (US); Irena Hudis, Bellevue, WA (US);
Lev Novik, Bellevue, WA (US); Balan Sethu Raman, Redmond, WA (US);
Yunxin Wu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 379 days.

(21) Appl. No.: 11/063,381

(22) Filed: Feb. 22, 2005

(65) Prior Publication Data

US 2006/0190506 A1    Aug. 24, 2006

(51) Int. Cl.
*G06F 17/30* (2006.01)

(52) U.S. Cl. .................. 707/821; 707/203; 707/204; 709/248

(58) Field of Classification Search .................. 707/100, 707/103 Y, 104.1, 201, 203, 204; 709/219, 709/231, 248
See application file for complete search history.

(56) References Cited

U.S. PATENT DOCUMENTS

| | | | | |
|---|---|---|---|---|
| 5,937,414 | A * | 8/1999 | Souder et al. | 707/203 |
| 6,401,104 | B1 * | 6/2002 | LaRue et al. | 707/203 |
| 6,493,720 | B1 | 12/2002 | Chu et al. | |
| 6,553,391 | B1 * | 4/2003 | Goldring et al. | 707/203 |
| 6,671,705 | B1 * | 12/2003 | Duprey et al. | 707/204 |
| 7,133,933 | B2 * | 11/2006 | Shah et al. | 709/248 |
| 2004/0073560 | A1 | 4/2004 | Edwards | |

FOREIGN PATENT DOCUMENTS

| CN | 1542637 A | 11/2004 |
|---|---|---|
| EP | 1452978 A | 9/2004 |

OTHER PUBLICATIONS

Maes, J. Sini et al. "The Push-IMAP Protocol (P-IMAP)". IETF Standard- Working-Draft, Feb. 2004.
Sinitsyn, Alexander. "A Synchronization Framework for Personal Mobile Severs." Pervasive Computing and Communications Workshops, Mar. 14, 2004.
European Patent Office, Extended European Search Report, EP Application No. 06110221.6-2201, dated Apr. 4, 2006, 6 pages.
Leiba, Network Working Group, Request for Comments: 3683, IMAP4 Implementation Recommendations, IBM T.J. Watson Research Center, Sep. 1999, 22 pages.

* cited by examiner

*Primary Examiner*—Fred I Ehichioya

(57) ABSTRACT

A system and method for synchronizing a database having metadata and raw data. Metadata may be fully synchronized between two systems, with copies stored on both systems. Raw data may be selectively synchronized, so that a client system need not store all of the raw data locally. When disconnected, the client system may identify certain portions of the raw data to store locally, and such data may be synchronized when reconnected to a server system.

21 Claims, 5 Drawing Sheets

GHOSTED SYNCHRONIZATION

BACKGROUND OF THE INVENTION a. Field of the Invention

The present invention pertains generally to computer databases and specifically to the synchronization of databases.

b. Description of the Background

Synchronized databases are those databases that may be used separately, but may from time to time be updated with respect to each other. For example, a file system on a portable computer may be connected with the file system of a server in an office. When the portable computer is used outside of the office, certain data may be stored on the portable computer so that the user may continue working. Some files may be changed and updated on the portable computer and likewise on the server.

The file structure on the portable computer and server may be synchronized when the portable computer is brought back to the office. The updated files from the portable computer may be transferred to the server, and likewise, updated files from the server may be transferred to the portable computer. When the file structure contains very large amounts of data, synchronization may be very lengthy and may require a large amount of storage space on both the portable and server computer.

It would therefore be advantageous to provide a system and method whereby useful work may be performed on the database in connected and unconnected situations without requiring lengthy and space consuming synchronization.

SUMMARY OF THE INVENTION

The present invention provides a system and method for synchronizing a database having metadata and raw data. Metadata may be fully synchronized between two systems, with copies stored on both systems. Raw data may be selectively synchronized, so that a client system need not store all of the raw data locally. When disconnected, the client system may identify certain portions of the raw data to store locally, and such data may be synchronized when reconnected to a server system. The metadata may contain various items that are related to the raw data. As such, those metadata may provide various useful functions to the client system, even when the raw data are not present. Manipulation of the metadata, including some functions that manipulate or cause changes to the raw data, may be performed 'off-line' and without the raw data present. When a subsequent re-synchronization event occurs, those changes may be propagated to the raw data.

DETAILED DESCRIPTION OF THE INVENTION

Figure 1:
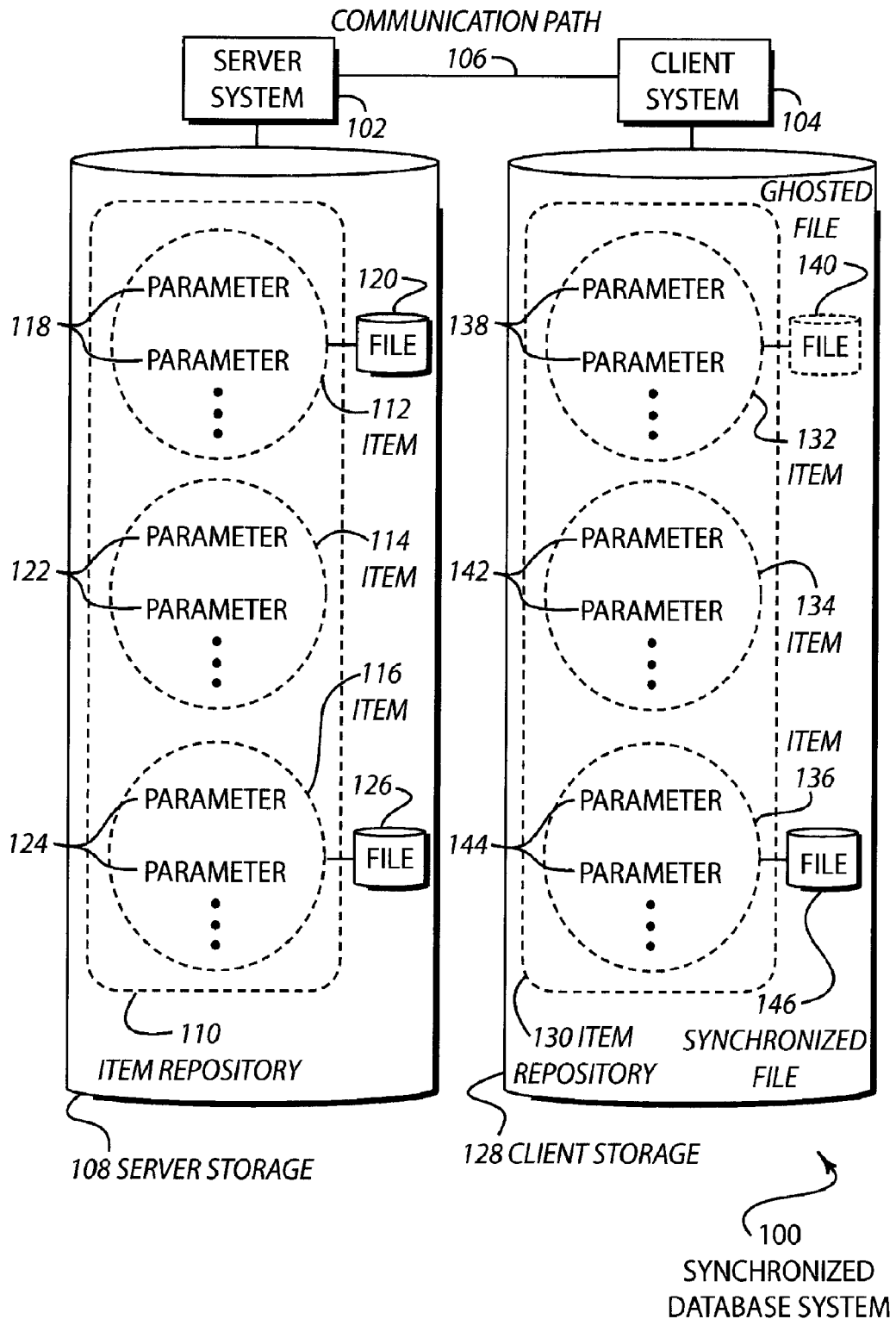
FIG. 1 is a diagrammatic illustration of an embodiment showing a synchronized database system.

While the invention is susceptible to various modifications and alternative forms, specific embodiments of the invention are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. In general, the embodiments were selected to highlight specific inventive aspects or features of the invention.

Throughout this specification, like reference numbers signify the same elements throughout the description of the figures.

When elements are referred to as being "connected" or "coupled," the elements can be directly connected or coupled together or one or more intervening elements may also be present.

The invention may be embodied as devices, systems, methods, and/or computer program products. Accordingly, some or all of the invention may be embodied in hardware and/or in software (including firmware, resident software, micro-code, state machines, gate arrays, etc.) Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above are also be included within the scope of computer readable media.

When the invention is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 illustrates an embodiment 100 of the present invention showing a synchronized database system. A server system 102 and a client system 104 are connected by a communications path 106.

The server system 102 has a storage system 108 that contains an item repository 110. Items 112, 114, and 116 are comprised of parameters 118, 122, and 124, respectively. Item 112 is related to file 120. Similarly, item 116 is related to file 126.

The client system 104 has a storage system 128 that contains an item repository 130. Items 132, 134, and 136 are comprised of parameters 138, 142, and 144, respectively. Item 132 is related to ghosted file 140. Item 144 is related to synchronized file 146.

The server system 102 and client system 104 may be computer systems or any other device that may store and manipulate data. In one embodiment, the server system 102 may be a server computer and the client system 104 may be a client computer, such as a portable laptop computer. In other embodiments, the client system 104 may be a portable media player, a personal information manager, or other device having at least some data storage.

The communication path 106 may be any type of communication mechanism by which the server 102 and client 104 may communicate. Examples include, but are not limited to, various wired communications protocols such as Ethernet, token ring, serial or parallel communications, various wireless protocols, telephony, or any other communications medium. In an example where the client system 104 is a laptop computer, the communications path 106 may be an internet connection. In some cases, various encryption protocols may be used.

The storage devices 108 and 128 may be hard disk storage systems or may be any other type of storage media including solid state memory such as flash memory. In some cases, the storage media may be non-volatile memory, while in other cases volatile memory may be used. Any type of data storage medium may be used.

The items 112, 114, and 116 may contain metadata and data that are useful for various applications. In an example of a typical general purpose computer system, the various items may relate to any type of data that may be used by applications operable on the computer system. For example, items may be created to store information relating to phone contacts, events on a calendar, tasks to perform, and the like.

Each item contains various parameters, which may be values specific to that type of item. For example, a contact item may contain parameters that store the name, company, address, and phone number of a contact. Different types of items may have different parameters, depending on the purpose and function of the item.

Other items may be related to specific raw data files, such as items 112 and 116 having relationships to files 120 and 126, respectively. In such cases, the items may have some or all of their parameters derived from the files. Such items may be known as file backed items. For example, a file containing an audio recording may have file backed item that contains metadata such as the name of the artist, the track name, the length of the recording, and other parameters. Similarly, a file containing a word processor document may have an associated file backed item containing the document title, the author's name, subject matter, and other classification parameters.

File backed items have a related file may contain various metadata about the file. These metadata may include derived data, which can be ascertained by analyzing the file directly, as well as non-derived data. Derived data may be created by executing an analysis routine that culls specific information from the raw data file and determines various parameter values. Such routines may be different for various types of files. For example, a file backed item associated with a word processor document may be created by scanning the document to determine a title, table of contents, keywords, author, or other parameters. These metadata are contained directly within the raw data.

In some cases, information may be culled from a raw data file, queried against external databases or otherwise processed to determine the appropriate parameter values. For example, an audio recording may have an identifier that may be checked against an on-line database to determine the artist, song title, album, genre, and original publication date. Such metadata is derived based on the contents of the raw data, even if the derived metadata is not contained in the raw data itself.

In some embodiments, each file in a database may have one related file backed item. In other embodiments, a single file backed item may relate to several raw data files or a single raw data file may have several associated file backed items.

Non-derived data may include other information that is not derived from the raw data itself. For example, parameters relating to an audio recording may include a user's rating of the recording or the number of times the recording has been played.

The systems may be configured so that changes to either the derived metadata or the raw data files are propagated to the other. For example, if changes were made to the title of a word processor document when the document was being edited, the title change may be subsequently updated in the metadata of the associated file backed item. Similarly, if the file backed item were updated with a new title change, the title of document may be propagated back into the raw data file.

For the purposes of this specification, the term file backed item is a subset of the generic term item. All descriptions and limitations of file backed items shall apply to all items, and some, but not all of the descriptions and limitations of generic items may apply to the term file backed items. The term file backed item shall refer to those items that contain at least some metadata that is derived in some fashion from the raw data of at least one associated file.

The client system 104 is synchronized with the server system 102. When synchronized, the server's item repository 110 is synchronized with the client item repository 130. On the initial synchronization, the server system 102 may merely copy the entire item repository 110 to the client system 104.

Subsequent synchronization events may involve detecting which items have been updated or changed since the last synchronization event. If an item has been updated, but the corresponding item on the opposite system has not been changed since the last synchronization, the updated item may be copied to the opposite system. If both the item and its corresponding item on the opposite system have been updated, a decision must be made to select one or the other item. In some embodiments, rules may be used for determining which item to keep, while in other embodiments, a user may be queried. Synchronization of files may follow the same methodology as synchronization of items.

In some embodiments, an indicator may be assigned to each metadata item or raw data file at synchronization. The indicator may be used to determine whether or not an item or raw data has been updated. In some embodiments, an incremental counter may be used as a version identifier. Upon each update of metadata or raw data, the counter may be incremented, so that when a synchronization event occurs, the version identifiers of the server and client metadata or raw data may be compared to determine if an update has occurred since synchronization.

In other embodiments, a timestamp may be used as a version indicator. The timestamp may include date and time, or may be another indicator of time such as a coded time signal. In still other embodiments, a simple flag may indicate whether or not an item or set of raw data has been updated.

In the present figure, items 118, 122, and 124 are synchronized with items 132, 134, and 136, respectively. Similarly, file 126 is synchronized with file 146.

File 140 is not synchronized with file 120, but is shown as 'ghosted.' File 140 may have some attributes of a file, such as a placeholder in a directory system, but the raw data underlying file 140 may not be available on the client system 104. When the client system 104 is disconnected from server system 102, the item 138 that relates to file 140 may be available, but the raw data in the file 140 may not be available.

Because the metadata relating to file 140 is contained in file backed item 132, certain functions and operations may be available to the user of the client system 104. Using the example of an audio file contained in file 140, the client system 104 may be able to display the various audio tracks, rate the individual tracks, group the tracks into playlists or other useful groupings, and perform other operations using only the metadata contained in item 132.

In addition, the metadata contained in item 138 may be used to manipulate various aspects of file 140. For example, the item 132 may be used to indicate that file 140 is to be synchronized rather than ghosted. Such an indication may cause the file 120 to be copied to file 140 on the next synchronization event. In another example, the item 132 may be used to move the file 140 into a different directory or hierarchical structure. Similarly, the item 132 may be used to indicate that the file 140 is to be deleted.

Many other actions may be indicated using the item 132 as both data on which to take action and one mechanism by which an action may be stored for later execution. Using the example of audio recordings, the item 132 may be displayed as the result of a query for music of a certain genre. A user may select item 132 for deletion from the database. Since file 140 is merely ghosted and not the raw data file, the deletion of the corresponding item 118 and file 120 cannot occur until the next synchronization. Thus, the deletion operation may be stored as a parameter in item 132 until the next synchronization occurs.

One of the practical benefits of ghosting files such as file 140 is that large databases having many raw data files may be much larger than the client storage 128 can hold. However, much of the usefulness of the data is still present because of the metadata contained in the various items stored in the item repository 130.

In some embodiments, the raw data contained in files 120 and 126 may be classified or secret raw data files that are only to be synchronized when there is a specific need-to-know. Metadata relating to the files may be unclassified or classified at a lower level than the raw data. For example, raw data files containing competitive sensitive information, secret military information, or other sensitive information may be kept on the server system 102 and not transferred to the client system 104 unless necessary.

In other embodiments, the raw data may be extraordinarily large files which may require a long time to transfer between the server system 102 and the client system 104. For example, if the raw data files were merely a few motion picture files that were gigabytes in size, synchronizing a movie library may take many minutes or even several hours, depending on the throughput of the communication path 106 among other things.

The item repositories 110 and 130 may be any type of data storage useful to store metadata and other data. In some embodiments, the item repositories 110 and 130 may be a single file in a directory or may be multiple files in multiple directories. In other embodiments, the item repositories 110 and 130 may be stored with the raw data in any other type of data storage scheme.

Figure 2:
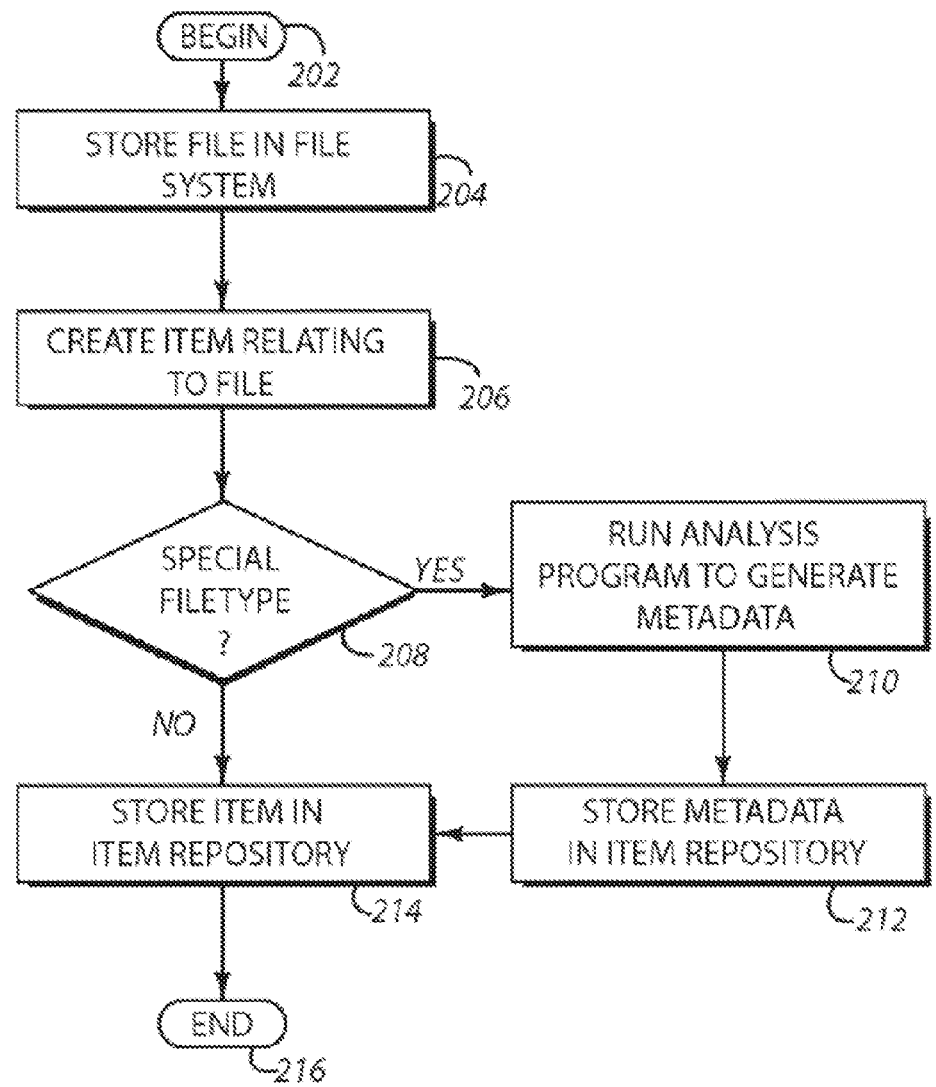
FIG. 2 is a flowchart diagram illustrating an embodiment showing a method for creating items related to files.

FIG. 2 is a flowchart illustration of an embodiment 200 of a method by which metadata may be generated from a file. The process begins in block 202. The file is stored in a file system in block 204. An item is created that relates to the file in block 206. If the file is a special type in block 208, an analysis program is run to generate metadata in block 210. The metadata is stored in the item in block 212. If the file is not a special type in block 208, or when the metadata is stored in the item in block 212, the item is stored in the repository in block 214. The process ends in block 216.

The embodiment 200 illustrates one method whereby metadata may be generated from raw data. In the embodiment 200, the raw data may be in the form of a file in a computer system. If the file is of a predetermined type, an analysis of the raw data may determine values for one or more metadata parameters. These parameters are stored in an item.

Embodiment 200 is useful when one application creates a raw data file, but the metadata may be useful in a second application. For example, if the raw data file were created by a word processing program, various metadata parameters, such as author, title, subject matter, etc., may be extracted from the raw data. The metadata may be used by a document management application to query, display, and manipulate various parameters relating to the documents.

In another embodiment, a raw data file containing numerical test data may be created by a test apparatus. An analysis program in block 210 may operate to extract measurement summary parameters from the data, such as maximum and minimum values. Additional metadata, such as parameters identifying the test apparatus, test subject, sample size, or other metadata may be added to the item separately.

Figure 3:
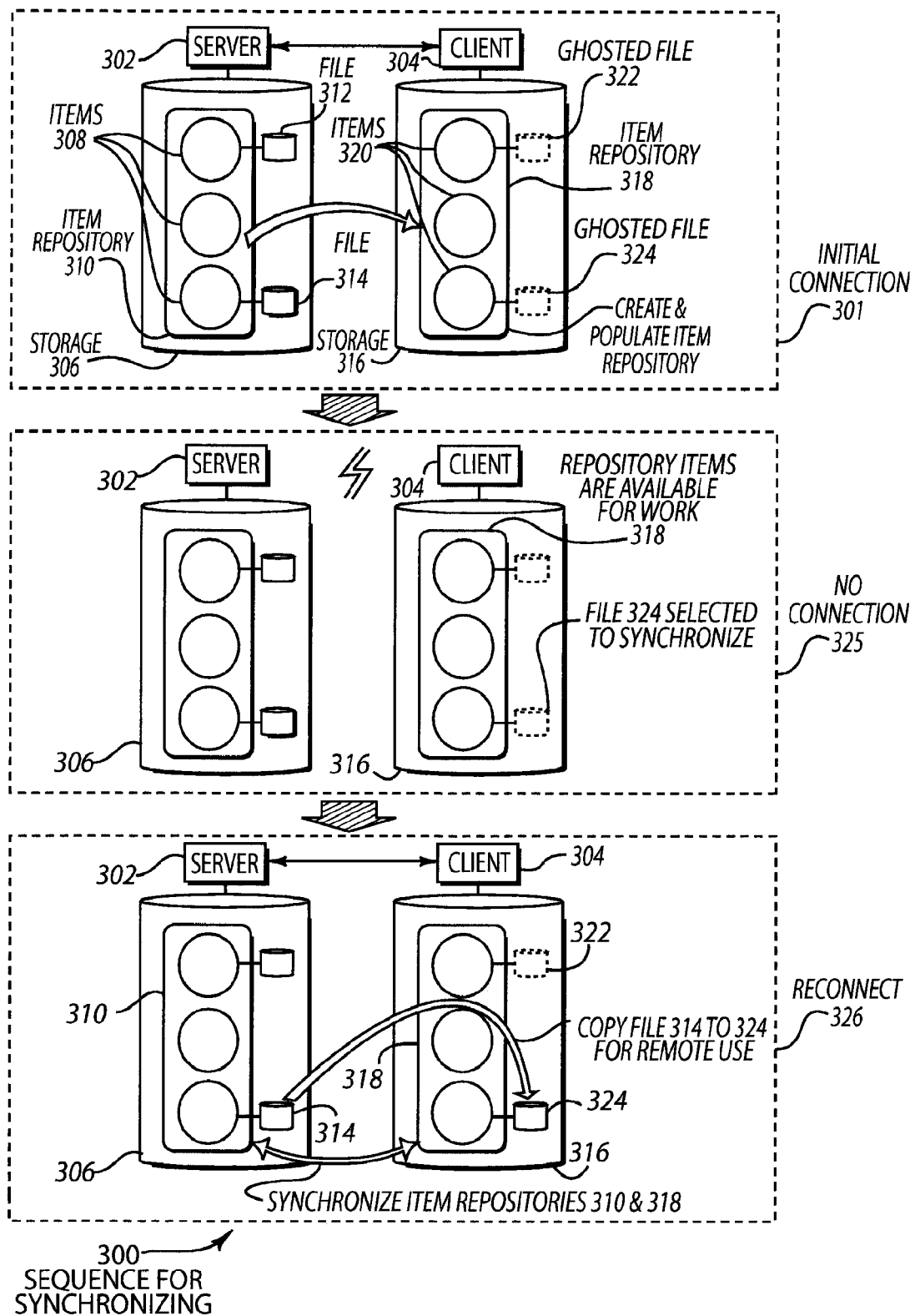
FIG. 3 is a diagrammatic illustration of an embodiment showing the sequence of events for synchronizing ghosted files.

FIG. 3 is a pictorial representation of an embodiment 300 of a sequence for synchronizing. The process shows an initial connection 301, a period where the systems are disconnected 325, and the actions at reconnection 326.

In the initial connection 301, a server 302 and client 304 are connected. The server 302 has a storage system 306 that contains items 308 in an item repository 310. Some of the items 308 have related files 312 and 314. During the initial connection 301, the client storage 316 is populated with a synchronized item repository 318 that contains items 320, which are copies of items 308 from the server 302. The two server referenced files 312 and 314 are ghosted on the client 304 as files 322 and 324.

During the initial connection 301, the item repositories 310 and 318 are synchronized and the raw data files 312 and 314 are ghosted on the server as ghosted files 322 and 324.

Block 325 shows the state of the systems when connection is severed. Server 302 maintains storage 306. Client 304 has storage 316 that contains an item repository 318 that enables various metadata and other functions to be performed. While disconnected, a ghosted file 324 may be selected for future synchronization.

Block 326 shows the systems upon reconnect. Server 302 and client 304 are reconnected. The item repositories 310 and 318 are synchronized between storage systems 306 and 316. As part of the synchronization routine, the file 314 replaces ghosted file 324 so that the raw data of file 324 may be available when disconnected.

Embodiment 300 illustrates one method of switching ghosted files to fully useable files. In embodiment 300, a ghosted file may be selected to be 'unghosted' or made a fully functional file on the next synchronization. The items and metadata relating to the raw data files are available in the offline mode, shown in block 325. These items and metadata may be used for many different functions, including selecting specific raw data files to make available offline.

Figure 4:
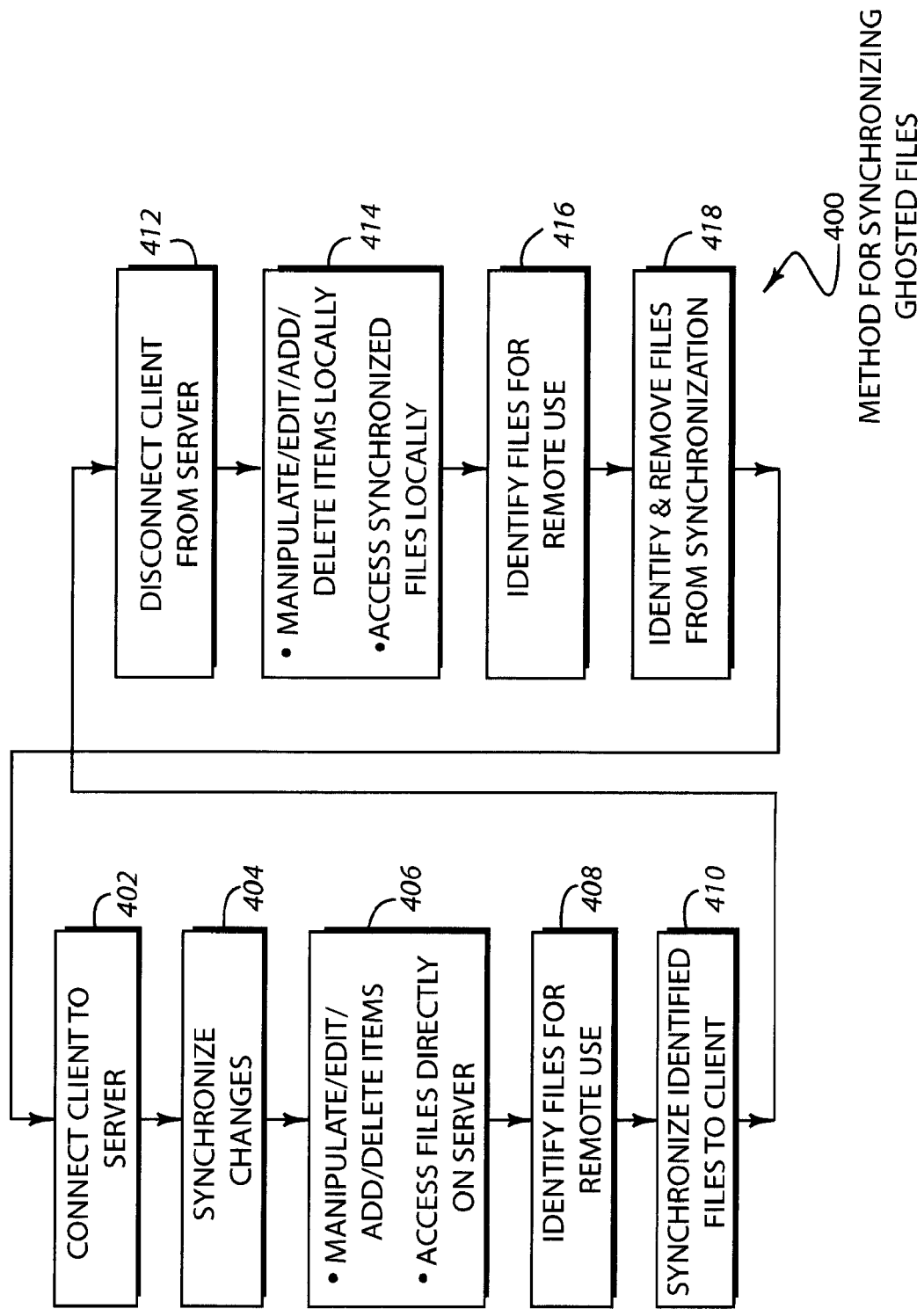
FIG. 4 is a flowchart diagram illustration of an embodiment showing a method for synchronizing ghosted files.

FIG. 4 is a flowchart illustration of an embodiment 400 of a method for synchronizing ghosted files. The client and server are connected in block 402. Changes between the client and server are synchronized in block 404. While connected, the client may manipulate, edit, add, and delete items as well as access raw data files directly on the server in block 406. The client may identify raw data files for remote use in block 408, and those raw data files are synchronized to the client in block 410.

When the client and server are disconnected in block 412, the client may manipulate, edit, add, and delete items using the local copy of the item repository, as well as access the synchronized raw data files locally in block 414. The client may also identify ghosted raw data files for remote use in block 416. Further, the client may remove raw data files from synchronization in block 418. This action may include actually deleting the raw data from the client data store in block 418.

When the client and server are reconnected in block 402, any changes to the items are synchronized as well as any changes to previously synchronized raw data files in block 404. Any files that were 'unghosted' or tagged to be made available offline may also be synchronized in block 404.

A database containing raw data and metadata is synchronized in two phases. In the first phase, metadata is synchronized between a server and client while the raw data remains on the server system. The client system, when connected or disconnected, may use and manipulate the metadata for any purpose whatsoever, including selecting one or more raw data files that are to be available on the client system. The second phase of synchronization is to synchronize the selected raw data to the client system. The synchronized raw data may be manipulated, changed, and used on the client system when disconnected. Upon reconnect, any changes made to the metadata or the raw data are synchronized between the systems.

One example of embodiments 300 and 400 may include a file structure for music files. The files 312 and 314 may be digitized audio files such as an MP3 format or other digital format. The items 308 for each audio file may contain the artist, track name, and length of the recording. The items may be stored in the item repository 310 and fully synchronized with the item repository 320.

After a connection is severed, as in state 325 of FIG. 3, the user of a client system 304 may be able to browse, manipulate, and change the items in the repository 318. For example, the user may sort the items by artist, select several items, and arrange the items into an audio playlist. Even though the audio files are not present in the data store 316, the user may perform many different tasks with the audio files. The user may additionally flag file 324 to be synchronized.

While the systems are disconnected in state 325, placeholders may be used for the files 322 and 324. The files are 'ghosted' and may or may not be seen in the directory structure. For example, ghosted files may be displayed as grayed out or semi-transparent.

When the connection is restored in state 326, any changes to the item repositories 310 and 318 are synchronized, and then any ghosted files that are flagged, such as file 324, are synchronized. The fully synchronized file 324 is then transferred to the client 304 and usable when the client 304 is disconnected from the server 302.

Figure 5:
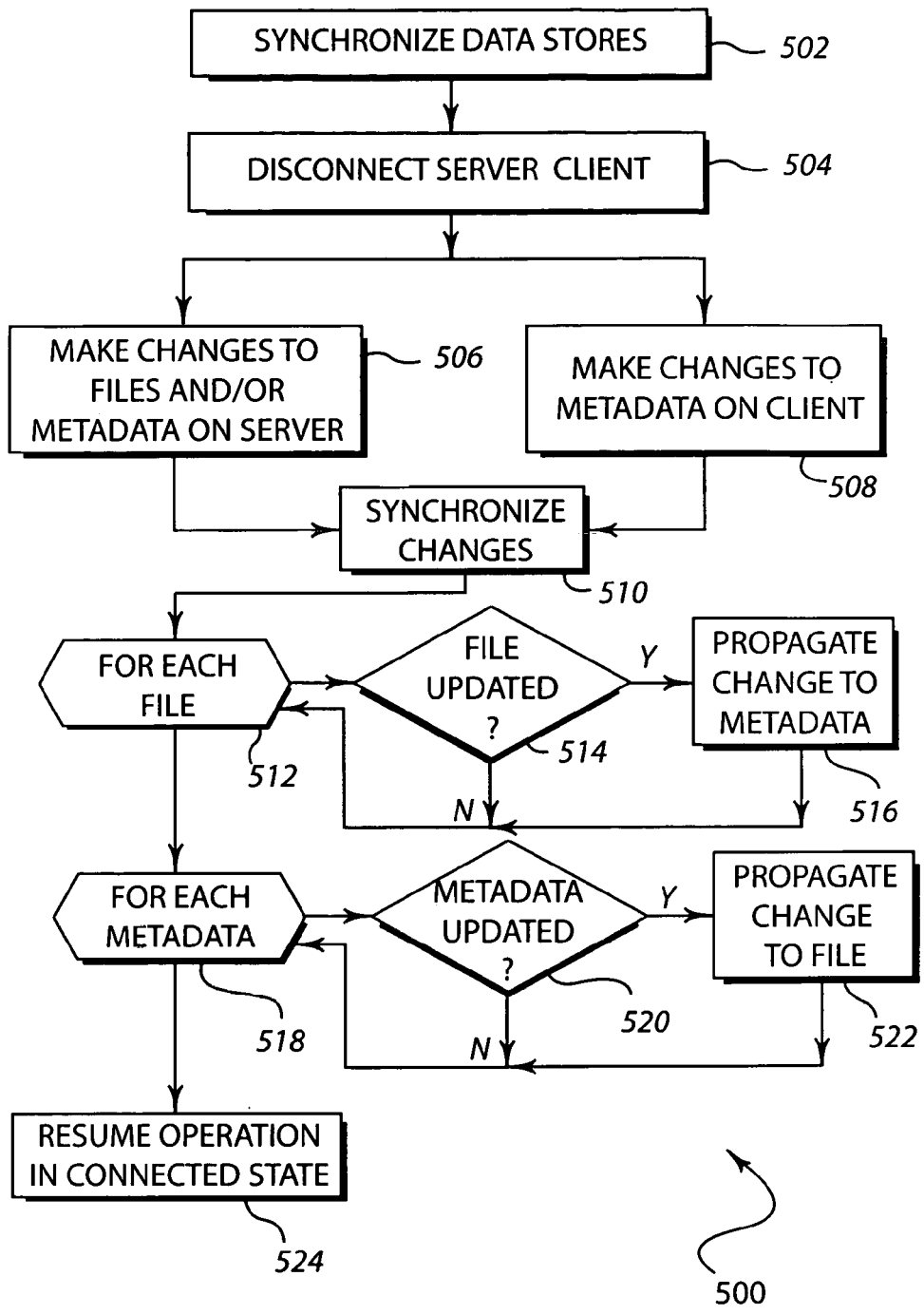
FIG. 5 is a flowchart diagram illustration of an embodiment showing a method for synchronizing changes to raw data files and metadata.

FIG. 5 is a flowchart illustration of an embodiment 500 showing a method for handling synchronized systems having file backed items. The data stores are synchronized in block 502, then the client and server are disconnected in block 504. Because the server contains both the metadata and raw data files for file backed items, changed to both can be made on the server in block 506. Since the client system has only the metadata portion of the file backed item, changed to the metadata only may be made on the client in block 508. When the client and server are reconnected, all changes are synchronized in block 510. For each file in block 512, if the file has been updated in block 514, the changes are propagated to the metadata in block 516. For each metadata in block 518, if the metadata has been updated in block 520, the changes are propagated to the raw data file in block 522. After all the changes have been propagated, operation is resumed in the connected state in block 524.

Embodiment 500 is one method by which changes to file backed items or the raw data associated with a file backed item may be kept current. Changes to either the raw data or the related metadata of the file backed item are used to update the other.

For example, several word processing document files may each be associated with file backed items. Parameters such as chapter headings, titles, keywords, and author may be derived from the raw data files and stored as metadata in the file backed items. When the data stores are synchronized, the file backed items with the metadata are stored on the client system, while both the file backed items and the raw data are stored on the server.

When the client and server are disconnected, changes may be made on the server to the raw data files by editing the word processor documents directly. Additionally, changes to the metadata may be made by editing the file backed items. On the client side, changes may only be made to the metadata, since the raw data are not available. In this example, one word processor document may be edited on the server to add a new chapter to the document. The chapter heading may be derived from the raw data file and added to the metadata of the file backed item. Similarly, the author parameter in a different file backed item may be changed on the client system.

When the client and server are reconnected, the changes to the raw data files, such as the additional chapter added to the file on the server, are propagated to the metadata of the related file backed items. In some cases, the changes may be propagated on the server when the changes are made but not be propagated to the client until reconnection.

Similarly, changes to the metadata on the client, such as the author change in the example above, would be propagated into the raw data file on the server when the client and server are reconnected. The word processor document may be opened, find the portion of the raw data file containing the author value, and overwrite the old value with the new one.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method comprising:
   using a computer comprising a memory, storing a file in a first file store on a first system;
   using the computer, creating metadata relating to said file in a first item store on said first system, said metadata being derived from the contents of said file and contained in a file backed item;
   connecting a second system to said first system, said second system having a second file store and a second item store, and while connected, synchronizing said first item store with said second item store without synchronizing the file to which said metadata refers, wherein after synchronization, the second item store comprises a copy of the metadata related to the file;
   disconnecting said second system from said first system, and while disconnected, modifying the copy of the metadata; and
   reconnecting said second system to said first system, and while connected, synchronizing said first item store with said second item store without synchronizing the file, wherein after synchronization, the metadata of the item store comprises the modification to the copy of the metadata.

2. The method of claim 1 wherein said synchronizing said first item store with said second item store comprises:
   finding an item on said first system having a first version and finding a corresponding item on said second system having a second version;
   identifying which of said first version or said second version is to be a kept version; and
   copying said kept version so that both said first item store and said second item store contain said kept version.

3. The method of claim 2 wherein said identifying comprises:
   examining an update indicator to determine that one of said first version and said second version has changed since the last synchronization.

4. The method of claim 3 wherein said update indicator is a timestamp.

5. The method of claim 3 wherein said update indicator is a flag.

6. The method of claim 3 wherein said update indicator is a version number.

7. The method of claim 1 wherein metadata is derived by a method comprising:
   determining a file type for said file; and
   determining metadata values of predetermined items based on said file type.

8. The method of claim 1 wherein metadata is derived by a method comprising:
   determining a file type for said file; and
   determining metadata values by summarizing at least a portion of data contained in said file.

9. The method of claim 1 further comprising:
   identifying a change to said file associated with said file backed item; and
   propagating said change to said metadata in said file backed item.

10. The method of claim 9 further comprising:
    identifying a change to said metadata in said file backed item; and
    propagating said change to said file associated with said file backed item.

11. A computer-readable medium having computer-executable instructions for performing the steps recited in claim 1.

12. A system comprising:
    a computer comprising a memory comprising:
    a first file store having a file;
    a first item store comprising a file backed item comprising metadata relating to said file, said metadata being derived from the contents of said file;
    a connection adapted to:
       connect to a second system, said second system having a second file store and a second item store, and while connected, synchronizing said first item store with said second item store without synchronizing the file to which said metadata refers, wherein after synchronization, the second item store comprises a copy of the metadata related to the file;
       disconnect from said second system, and while disconnected, modifying the copy of the metadata; and
       reconnect to said second system, and while connected, synchronizing said first item store with said second item store without synchronizing the file, wherein after synchronization, the metadata of the item store comprises the modification to the copy of the metadata.

13. The system of claim 12 wherein said synchronizing said first item store with said second item store comprises:
    finding an item on said first system having a first version and finding a corresponding item on said second system having a second version;
    identifying which of said first version or said second version is to be a kept version; and
    copying said kept version so that both said first item store and said second item store contain said kept version.

14. The system of claim 13 wherein said identifying comprises:
    examining an update indicator to determine that one of said first version and said second version has changed since the last synchronization.

15. The system of claim 14 wherein said update indicator is a timestamp.

16. The system of claim 14 wherein said update indicator is a flag.

17. The system of claim 14 wherein said update indicator is a version number.

18. The system of claim 12 wherein metadata is derived by a method comprising:
    determining a file type for said file; and
    determining metadata values of predetermined items based on said file type.

19. The system of claim 12 wherein metadata is derived by a method comprising:
   determining a file type for said file; and
   determining metadata values by summarizing at least a portion of data contained in said file.

20. The system of claim 12, said connection further adapted to:
   identify a change to said file associated with said file backed item; and
   propagate said change to said metadata in said file backed item.

21. The system of claim 20, said connection further adapted to:
   identify a change to said metadata in said file backed item; and
   propagate said change to said file associated with said file backed item.

\* \* \* \* \*